(12) United States Patent
Abe et al.

(10) Patent No.: US 7,323,132 B2
(45) Date of Patent: Jan. 29, 2008

(54) METHOD OF MAKING THREE-DIMENSIONAL OBJECT

(75) Inventors: Satoshi Abe, Moriguchi (JP); Isao Fuwa, Osaka (JP); Hirohiko Togeyama, Tondabayashi (JP); Norio Yoshida, Nara (JP); Masataka Takenami, Osaka (JP); Shuushi Uenaga, Moriguchi (JP)

(73) Assignee: Matsushita Electric Works, Ltd., Osaka (JP)

( * ) Notice: Subject to any disclaimer, the term of this patent is extended or adjusted under 35 U.S.C. 154(b) by 297 days.

(21) Appl. No.: 10/671,688

(22) Filed: Sep. 29, 2003

(65) Prior Publication Data
US 2005/0029711 A1    Feb. 10, 2005

(30) Foreign Application Priority Data
Sep. 30, 2002    (JP)    ............ P 2002-287766

(51) Int. Cl.
B29C 35/08    (2006.01)
B29C 37/02    (2006.01)
B29C 41/02    (2006.01)
(52) U.S. Cl. .............. 264/497; 264/161; 264/163
(58) Field of Classification Search ........... 264/497, 264/161, 163
See application file for complete search history.

(56) References Cited

U.S. PATENT DOCUMENTS 6,657,155 B2 * 12/2003 Abe et al. ............. 219/121.6
6,682,684 B1 *  1/2004 Jamalabad et al. ......... 264/308
7,172,724 B2    2/2007 Abe et al.
2002/0041818 A1  4/2002 Abe et al.
2006/0208396 A1  9/2006 Abe et al.

FOREIGN PATENT DOCUMENTS

| | | |
|---|---|---|
| CN | 1347783 | 5/2002 |
| DE | 19953000 | 5/2001 |
| DE | 10148967 | 4/2002 |
| JP | 2620353 | 3/1997 |

(Continued)

OTHER PUBLICATIONS

English Language Abstract of JP 2620353, (Mar. 11, 1997).

(Continued)

*Primary Examiner*—Leo B. Tentoni
(74) *Attorney, Agent, or Firm*—Greenblum & Bernstein, P.L.C.

(57) ABSTRACT

The invention relates to a method of making a three-dimensional object, comprising the steps of:
(a) forming a powder material layer (10) of inorganic material;
(b) irradiating an optical beam (L) on a predetermined portion of the powder material layer (10) to form a first sintered layer (11) and integrate the first sintered layer (11) with a second sintered layer (11) just below the first sintered layer (11);
(c) repeating the steps (a) and (b) to form a sintered block (B) united with a plurality of the first and second sintered layers (11), the sides of the sintered block (B) including a concave portion (g);
(d) removing an excess portion (17) from a surface of the sintered block (B); and
(e) repeating the steps (c) and (d) with respect to the sintered block (B) from which the excess portion (17) is removed, in order to make a target shape of a three-dimensional object united with a plurality of the sintered blocks (B).

11 Claims, 15 Drawing Sheets

FOREIGN PATENT DOCUMENTS

| | | |
|---|---|---|
| JP | 2000-306546 | 10/2000 |
| JP | 2001-152204 | 6/2001 |
| JP | 2002115004 A | 4/2002 |
| WO | 88/02677 | 4/1988 |

OTHER PUBLICATIONS

English Language Abstract of JP 2000-306546, (Oct. 5, 2000).
English Language Abstract JP 2001-152204, (Jun. 5, 2001).
English Language Abstract of DE 19953000, (May 17, 2001).

* cited by examiner

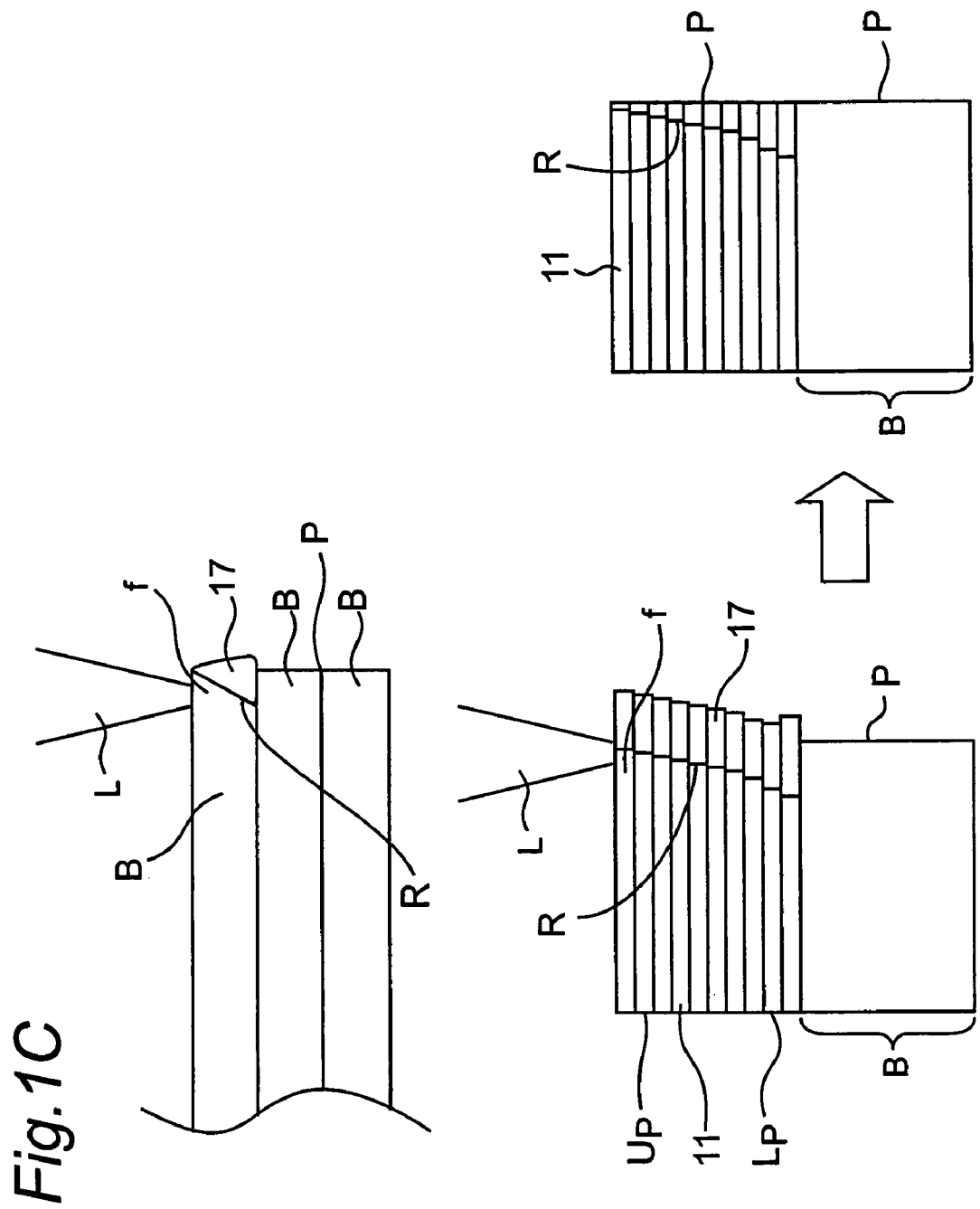

METHOD OF MAKING THREE-DIMENSIONAL OBJECT

BACKGROUND OF THE INVENTION

1. Field of the Invention

The present invention relates to a method of making a three-dimensional object by sintering and curing a powder material by irradiating an optical beam thereon.

2. Description of the Related Art

The three-dimensional object is made in such a manner that cross-sectional data of plural layers that are sliced in a desired layer thickness are obtained from design data (CAD data) of the three-dimensional object, a scanning outline shape is calculated on the basis of the cross section data of these layers, and a plurality of layers is united in a three dimension to be sintered and cured by repeating irradiation of an optical beam on a powder material and curing of this powder material. Accordingly, a method of making the three-dimensional object is characterized in that, without so-called CAM (Computer aided manufacturing) apparatus, the three-dimensional object in an arbitrary shape can be made, and further, compared to a making method such as cutting process or the like, the three-dimensional object in a desired shape can be made more rapidly.

Japanese Patent No. 2620353 discloses a method of making a three-dimensional object, which is known as an optical formation method. According to the making method disclosed in Japanese Patent No. 2620353, by irradiating the optical beam on a predetermined portion of the powder material, a sintered layer, on which the powder material is sintered, is formed, and by repeating the formation of the powder material layer and the sintered layer, the three-dimensional object is made. According to this method, by performing a removing step for removing an excess portion from a surface of laminated provisional three-dimensional object only once, the three-dimensional object having the desirable shape has been made finally.

By the way, upon irradiating the optical beam and sintering the powder material, a heat generated by the irradiation of the optical beam is used. The generated heat is transmitted to a periphery of the sintered portion, so that the periphery has been also heated to a high temperature. Since the periphery portion that is heated to a high temperature has a high reactivity, the powder material at the periphery tends to attach to the periphery portion. If the powder material attaches to the periphery portion, this attached powder material changes its nature into an accretion in a low density by its heat. In order to gain the three-dimensional object having a smooth surface, it is necessary to remove the accretion in a low density.

Therefore, the present applicant suggests a following making method in JP-A-2000-306546. In other words, a making method disclosed in JP-A-2000-306546 includes the steps of forming a powder material layer; irradiating an optical beam on a predetermined portion of the powder material layer and sintering the powder material of the predetermined portion thereof to form a sintered layer; repeating these steps to form a sintered block united with a plurality of the sintered layers; removing an excess portion from a surface of the sintered block to have a desired outline shape; and repeating the power material layer forming step and the sintered layer forming step with respect to the sintered block from which the excess portion is removed. In other words, the present applicant suggests a method, whereby a lower sintered block united with a plurality of sintered layers is formed, the excess portion is cut and removed from the lower sintered block, and then, a first sintered layer of the next upper sintered block is formed. According to this method, by repeating the sintered block forming step and the step of cutting and removing an excess portion at the sintered block, without a restriction such as a length of an industrial tool, it is possible to smoothly finish a surface of the three-dimensional object.

However, the above-described method having a step of cutting and removing the excess portion from the sintered block also involves a following problem.

In other words, as shown in FIG. 14, at first, from a lower sintered block B united with a plurality of sintered layers, the excess portion on the surface and the side thereof is removed by using a cutting tool 41 or the like. In the next place, when forming an upper sintered block B+1, by which the lower sintered block B is to be united with a plurality of sintered layers on its surface, with respect to the outside surface of the lower sintered block B, from which the excess portion has been removed and has a smooth finished surface, the excess powder material at the periphery thereof is attached and sintered. As a result, an excess sintered portion 17 hanging like an icicle is formed. Then, even if the excess portion is cut and removed from the sintered block B+1 on the excess sintered portion 17 by using the cutting tool 41 or the like, this excess sintered portion 17 is not removed and is left. Therefore, on the outer surface of the accomplished three-dimensional object, regularities due to the excess sintered portion 17 are formed.

Needless to say, upon removing the excess sintered portion 17 of the upper sintered block B+1, it is technically possible to remove the excess sintered portion 17 that is formed on the outside surface of an upper part of the lower sintered block B. However, in this case, an area to be removed becomes large, and it takes a long time to remove the excess sintered portion 17. Then, since a removing and processing time for removing each of the excess sintered portion 17 on a plurality of sintered blocks is increased, total of the removing and processing time has been increased significantly.

SUMMARY OF THE INVENTION

The present invention has been made taking the foregoing problems into consideration, an object of which is to provide a method of making three-dimensional object to solve the problem due to formation of an excess sintered portion.

The invention may include the steps of: (a) forming a powder material layer of inorganic material;

(b) irradiating an optical beam on a predetermined portion of the powder material layer to form a first sintered layer and integrate the first sintered layer with a second layer just below the first sintered layer; (c) repeating the steps of (a) and (b) to form a sintered block united with a plurality of the first and second sintered layers, the sides of the sintered block including a concave portion; (d) removing an excess portion from a surface of the sintered block; and (e) repeating the steps (c) and (d) with respect to the sintered block from which the excess portion is removed, in order to make a target shape of a three-dimensional object united with a plurality of the sintered blocks. According to the invention set forth in claim 1, forming the concave portion at the sides of the sintered block and thrusting the upper part of the sintered block relatively to the outside, a hanging portion of the excess sintered portion is accepted by the concave portion of the lower part of the sintered block.

According to another embodiment of the invention, the above-described concave portion is formed on a lower part of the sintered block. The hanging portion of the excess sintered portion runs through the sides of the upper part of the sintered block to be accepted by the concave portion of the lower part of the sintered block.

According to a further embodiment of the invention, an upper surface of the concave portion is substantially declined from the outside toward the inside. The hanging portion of the excess sintered portion is accepted by the concave portion of the lower part of the sintered block and more hanging portion of the excess sintered portion can be accepted by the declined space.

The invention may further include the step of uniting with a thin sheet covering the top surface of the sintered block from which the excess portion is removed. By arranging the thin sheet of a larger area than that of the sintered block, which covers the sintered block from which the excess sintered portion is removed, the hanging of the excess sintered portion can be prevented.

The invention further may further include the step of treating the surface of the sintered block removed the excess portion to be unreactive with the powder material. By treating the surface of the sintered block removed the excess portion to be low reactive with the powder material, it is possible to prevent the excess sintered portion.

The invention may further include the step of, after the step of treating the surface, the step of placing non-adhesive powder around the surface of the sintered block. By arranging the non-adhesive powder around the surface of the sintered block, of which surface is treated, it is possible to prevent the excess sintered portion from being generated due to attachment of the powder material around the surface of the sintered block.

The invention may further include the step of, after the step of treating the surface, placing a mask on the top surface of the sintered block, the mask having an aperture that is approximately equal to the outline of the sintered block. By arranging the mask having the aperture that is approximately equal to the outline of the sintered block, of which surface is treated, it is possible to prevent the excess sintered portion from being generated due to attachment of the powder material around the surface of the sintered block.

In addition, the invention further include the steps of (a) forming a powder material layer of inorganic material; (b) irradiating an optical beam along an outline of predetermined portion to be sintered of the powder material layer to form an outline sintered portion; (c) irradiating the optical beam on all of predetermined portions to be sintered of the powder material layer to form a first sintered layer and integrate the first sintered layer with a second sintered layer just below the first sintered layer, in which each of the predetermined portions is the predetermined portion; (d) repeating the steps (a) and (c) to form a sintered block united with a plurality of the first and second sintered layers; (e) removing an excess portion from a surface of the sintered block; and (f) repeating the steps (a), (b), (c), (d) and (e) with respect to the sintered block removed the excess portion to make a target shape of a three-dimensional object united with a plurality of the sintered blocks. If the optical beam is irradiated throughout the portion to be sintered after providing an outline-sintered portion having a high heat conductivity along an outline of the predetermined portion to be sintered, the heat to be generated by the irradiation of the optical beam may be conducted to the powder material layer at the inside of the outline-sintered portion and the lower sintered block through the outline-sintered portion having a high heat conductivity, so that it prevents the heat from being conducted from the outline-sintered portion to the outside thereof. As a result, by attachment of the powder material on the side surface of the lower sintered block, it is possible to prevent the excess sintered portion hanging like an icicle from being generated.

According to the present invention, the excess sintered portion is prevented from being generated when the powder material is attached to the side surface of the sintered block, and even if the excess sintered portion is formed on the side surface of the sintered block, the excess sintered portion is prevented from hanging along the side surface of the sintered block and running out of this side surface. As a result, since a depth to be processed by a removing means for removing the excess sintered portion corresponds to the thickness of approximately one sintered block, the removing process time can be shortened.

BRIEF DESCRIPTION OF THE DRAWINGS

FIG. 1C is an explanatory view showing an embodiment according to the present invention;

DESCRIPTION OF THE PREFERRED EMBODIMENTS

Figure 12:
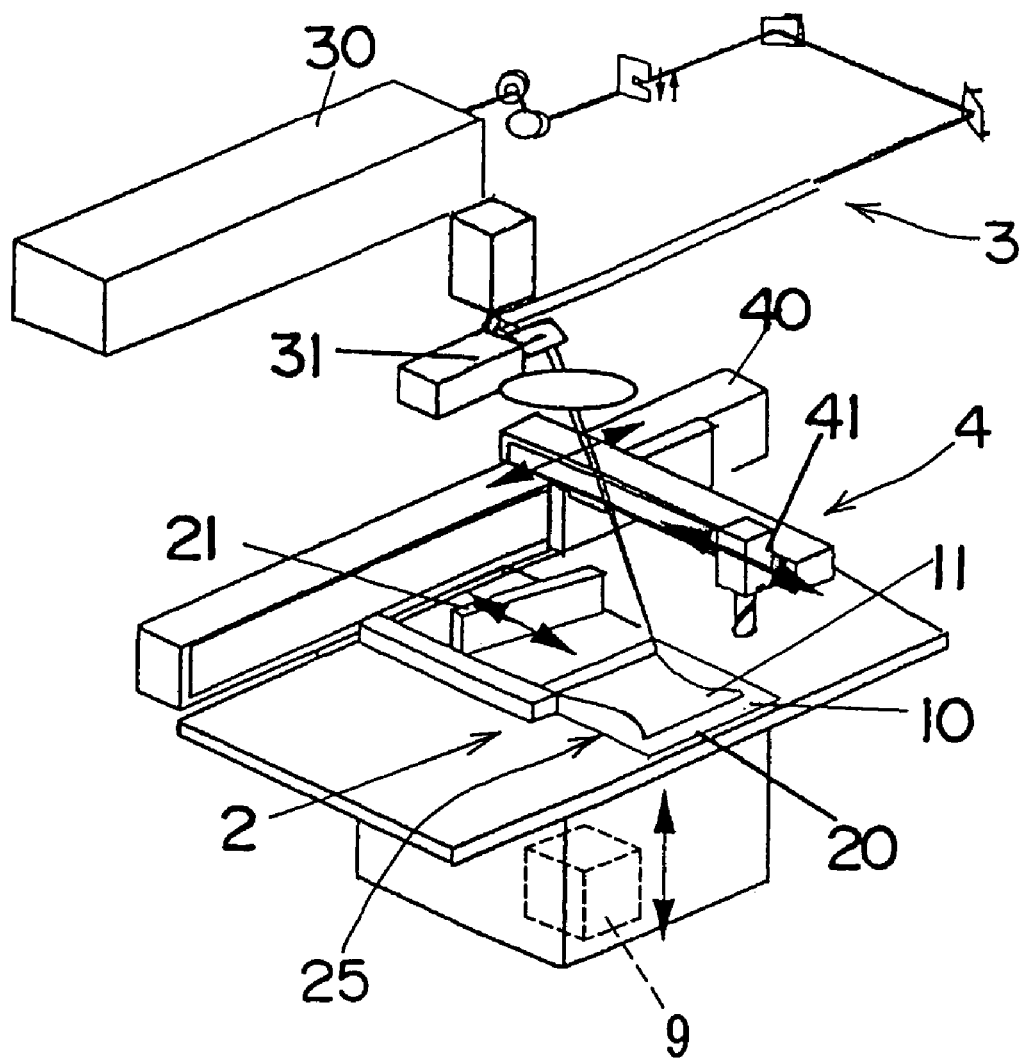
FIG. 12 is a perspective view showing an entire configuration of an apparatus of making a three-dimensional object.

FIG. 12 shows an apparatus for making a three-dimensional object according to an optical formation method. The apparatus shown in FIG. 12 is provided with powder layer forming means 2, sintered layer forming means 3, and cutting and removing means 4.

The powder layer forming means 2 serves to form a material powder layer 10 of a predetermined thickness $\Delta t1$ by smoothing a supplied inorganic powder material 10a with a squeezing blade 21 in a space (a formation tank 25), which is provided on a stage for forming the three-dimensional object, namely, an elevating table 20 moving up and down and of which outer periphery is surrounded. The sintered layer forming means 3 serves to form a sintered layer 11 by scanning a laser outputted from a laser oscillator 30 on the above-described powder material layer 10 through a scan optical system such as a galvanometer mirror 31 or the like and sintering the powder material layer 10. As the cutting and removing means 4, for example, a mealing head 41 is used. The mealing head 41 is attached to an XY driving mechanism 40, which is configured so as to be freely driven in an XY direction with respect to a base plate 22 of the above-described powder layer forming means 2.

Figure 13:
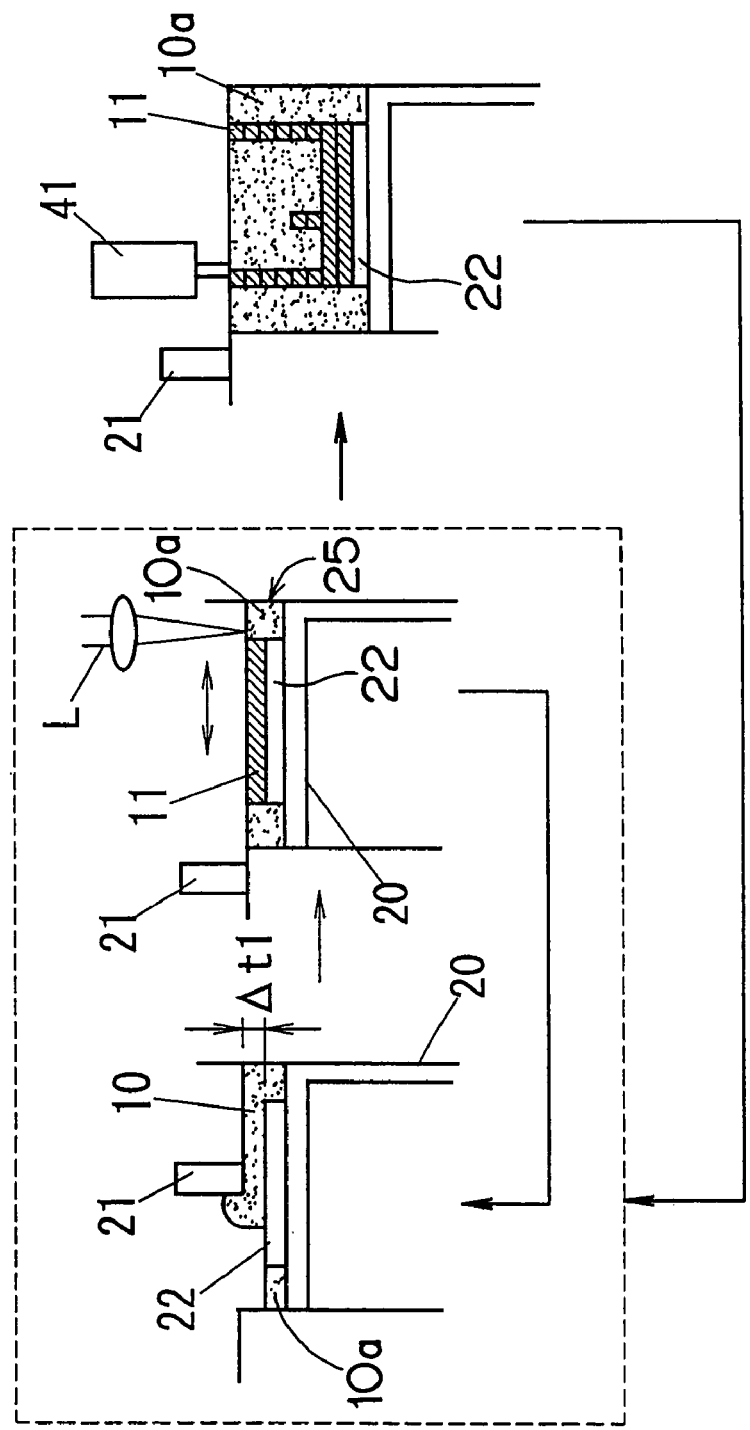
FIG. 13 is a view explaining the basic operation of the apparatus of making a three-dimensional object shown in FIG. 12.
Figure 14:
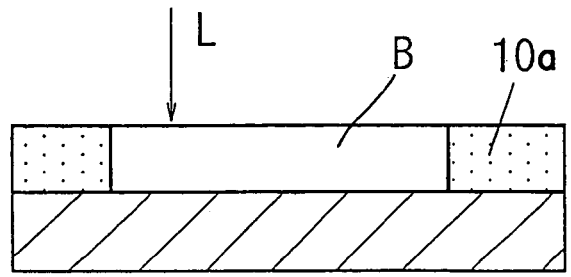
FIG. 14 is a view explaining a making procedure of a three-dimensional object according to a conventional art.
Figure 14:
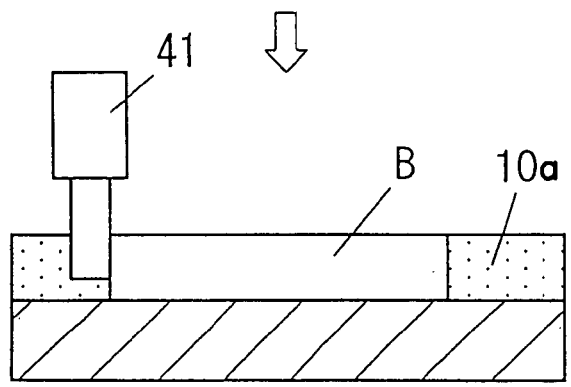
Figure 14:
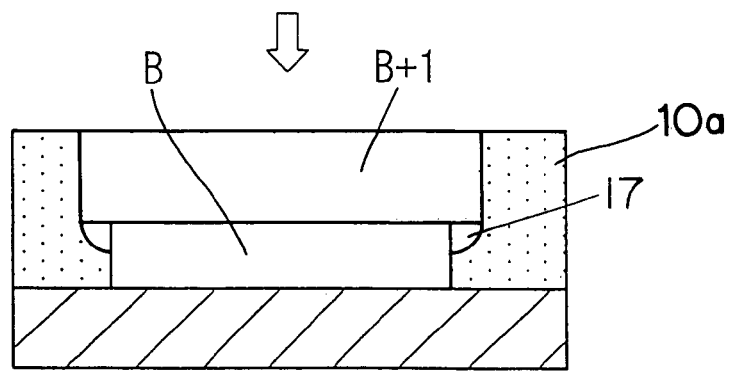
Figure 14:
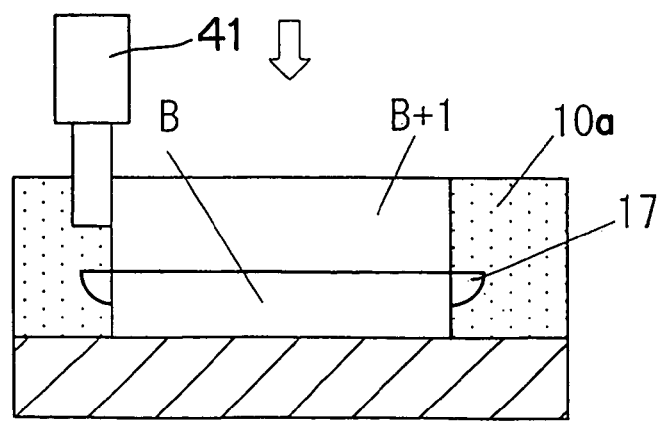

A basic making procedure of the three-dimensional object will be explained with reference to FIG. 13. By providing a predetermined amount of the powder material 10a on the surface of the base plate 22, which is arranged on the upper surface of the elevating table 20, to be smoothed with the blade 21, a first powder material layer 10 is formed. By irradiating an optical beam (laser) L on a portion of this powder material layer 10 to be sintered, the powder material layer 10 is sintered, and at the same time, a sintered layer 11, which is integrated with the base plate 22, is formed.

Then, by providing the powder material 10a once again with the elevating table 20 slightly sent down and then, smoothing it with the blade 21, a second powder material layer 10 is formed. By irradiating the optical beam (laser) L on a portion of this powder material layer 10 to be sintered, the powder material layer 10 is sintered, and at the same time, the sintered layer 11, which is integrated with the lower sintered layer 11, is formed. By repeating a step of sending down the elevating table 20, a step of forming a new powder material layer 10, and a step of irradiating the optical beam L and making a required portion into the sintered layer 11, the sintered block B configuring a portion of the target three-dimensional object is made.

An irradiation path of the optical beam L is made on the basis of the data of the three-dimensional CAD in advance. In other words, similarly to the conventional irradiation path, the STL data (Stereo Lithography) data generated by the three-dimensional CAD model is sliced in a layer at an equal pitch (for example, 0.05 mm). After obtaining an external outline shape P of each cross sectional layer, a scanning outline shape R is further obtained from the external outline shape P. In this time, it is preferable that the irradiation of the optical beam L is carried out so that at least uppermost surface is sintered at a high density (not more than an air hole ratio 5%).

Upon repeating the step of forming the powder material layer 10 and then, the step of irradiating the optical beam L to form the sintered layer 11 as described above, if the entire thickness of the sintered layer 11 takes a required value that is decided by the length of the tool of the mealing head 41 at the cutting and removing means 4, the cutting and removing means 4 is operated once and a surface portion (including a side surface) of the sintered block B that has been made so far is cut and processed. As a result, the sintered block B having a smooth surface and a desired external outline shape P can be obtained. For example, the tool of the mealing head 41 (a ball end mill) having a diameter of 1 mm and an effective blade of 3 mm can perform the cutting and process of a depth 3 mm. Then, if a thickness $\Delta t1$ of the powder material layer 10 is 0.05 mm, for example, when the sintered block B, on which fifty layers of the sintered layer 11 are united, is made, by operating the cutting and removing means 4, the cutting and processing will be performed.

Due to transformation of the powder material 10a attached on the surface of the sintered block B by a heat generated by irradiation of the optical beam L, a low density surface layer is generated on the surface of the sintered block B. This low density surface layer is cut and processed by the cutting and removing means 4. In this time, by chipping the low density surface layer up to the high density portion, the high density portion may be completely exposed on the surface of the sintered block B. In this case, the sintered block B to be cut and processed may be configured so as to be slightly larger than the desired external outline shape P. The cutting and processing path by the cutting and removing means 4 is made of the three-dimensional CAD data in advance similarly to the irradiation path of the optical beam L. Then, with respect to the lower sintered block B, of which low density surface layer has been cut and removed by the above-described cutting and removing means 4, the powder material layer 10 and the sintered layer 11 are formed repeatedly, so that a new upper sintered block B is formed on the lower sintered block B.

Figure 1A:
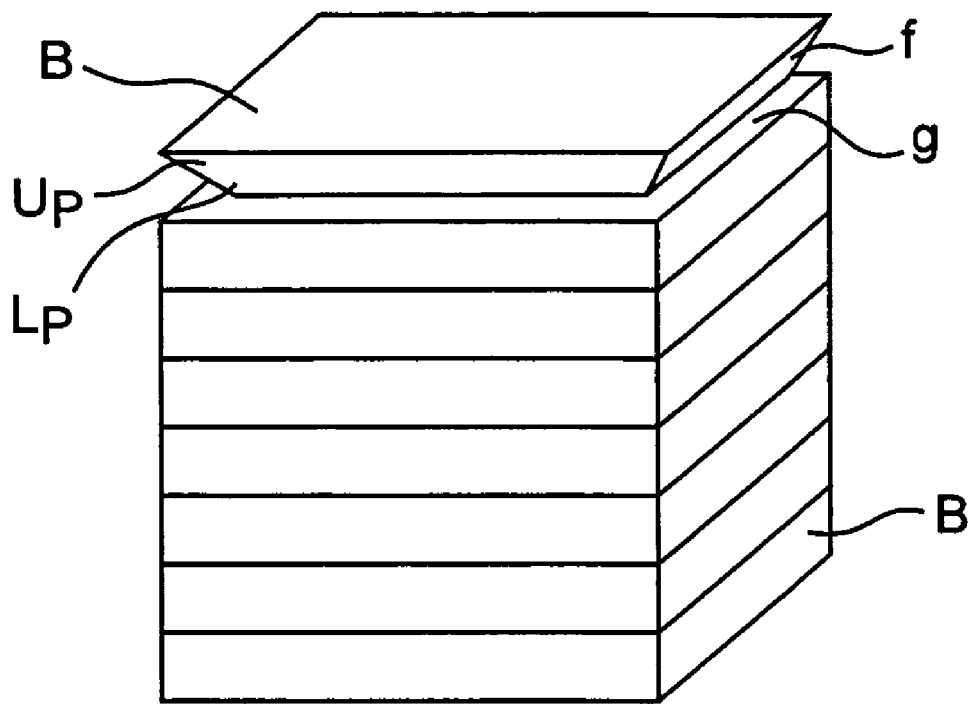
FIG. 1A is a perspective view showing an embodiment according to the present invention.
Figure 1B:
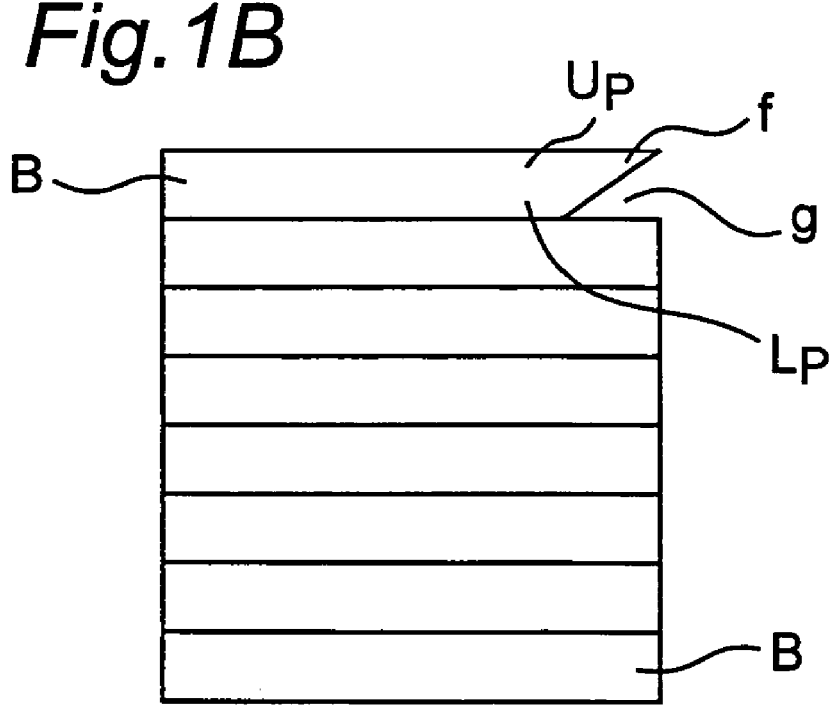
FIG. 1B is a cross sectional view showing an embodiment according to the present invention.
Figure 2A:
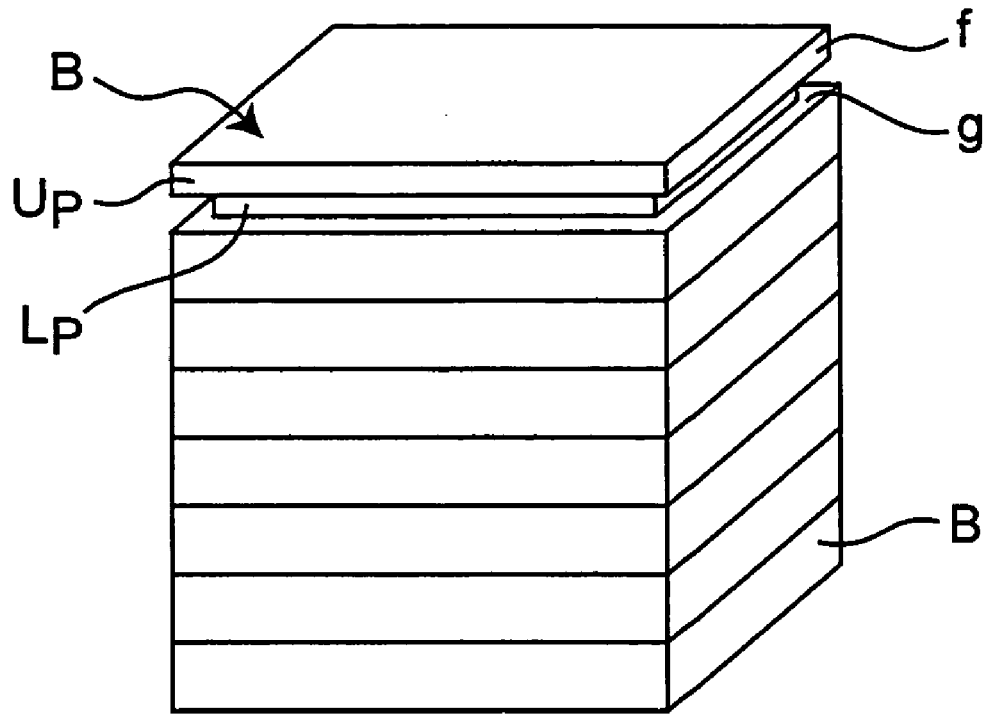
FIG. 2A is a perspective view showing the other embodiment according to the present invention.
Figure 2B:
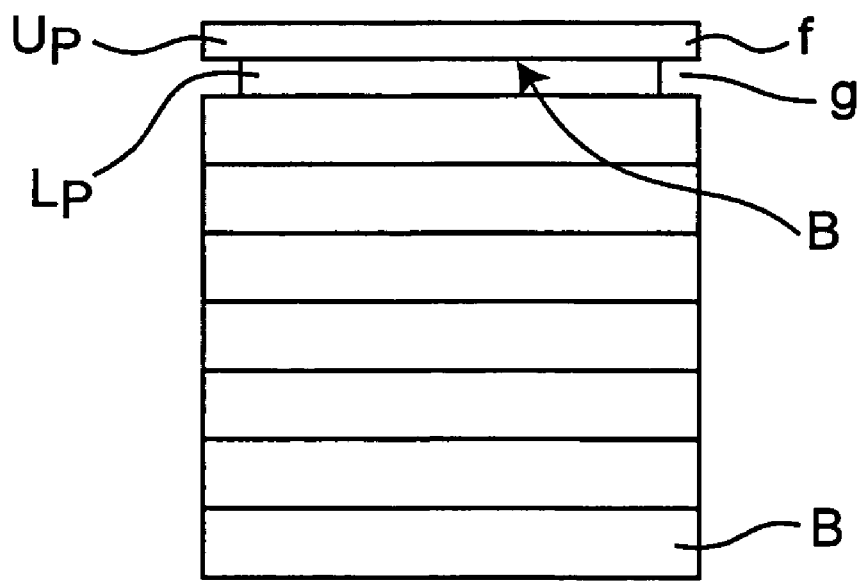
FIG. 2B is a cross sectional view showing the other embodiment according to the present invention.
Figure 3:
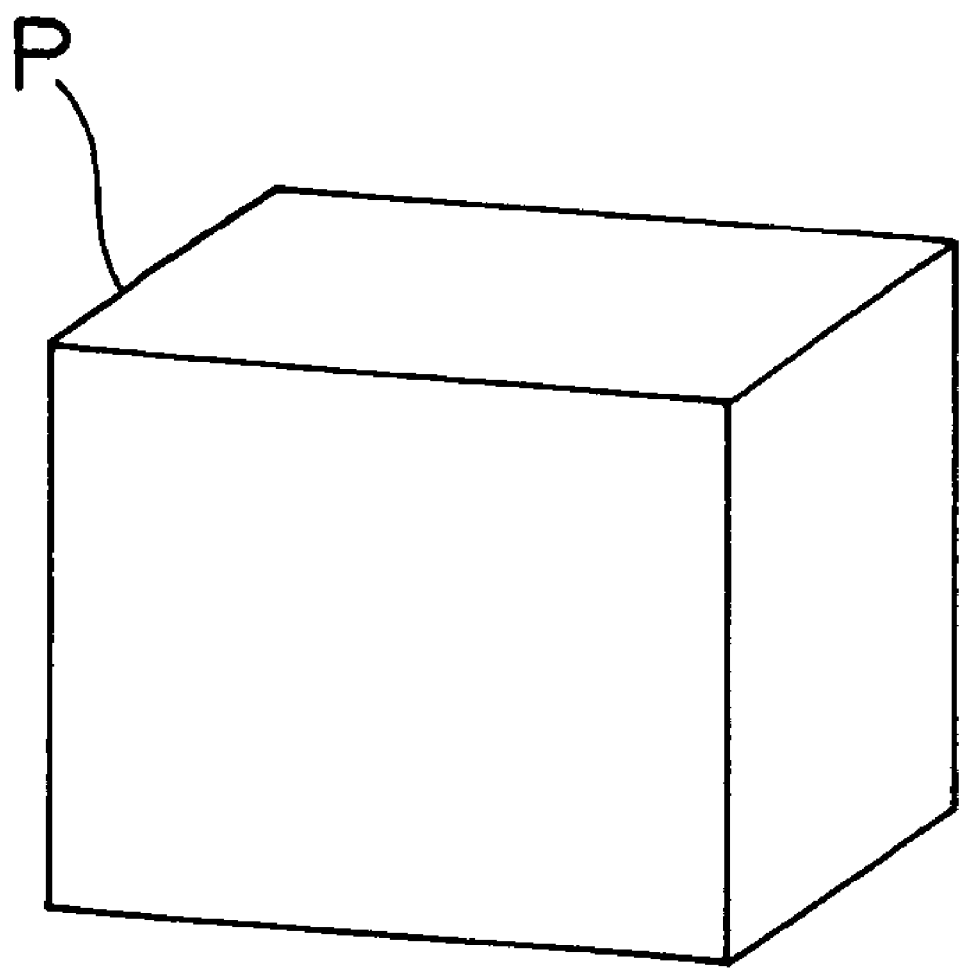
FIG. 3 is a perspective view of a three-dimensional CAD model.

In the sintered block B, on which a plurality of sintered layers 11 are laminated, a low layer portion L of this sintered block B is designed so as to be set back and be shorter in a horizontal direction. In other words, the scanning outline R of each layer is configured so that a side end in design of an upper part $U_P$ has a shape throwing out from a side end in design of the low layer portion L. For example, as shown in FIGS. 1A, 1B and 1C, at a side surface of the sintered block B, on which a plurality of sintered layers 11 are laminated, the data of the scanning outline shape R is configured so as to have a shape, which is notched in a substantially slope from an upper part $U_P$ across a lower part $L_P$. As clearly shown in FIG. 1C, when the optical beam L is irradiated along the scanning outline shape R on the basis of the three-dimensional CAD data upon forming each sintered layer 11, the powder material 10a existing on the side surface of the sintered layer 11 to be irradiated is sintered together, and this results in formation of the excess sintered portion 17 at the side surface of the sintered layer 11. The scanning outline shape R, on which the optical beam L is scanned, is positioned at a shorter length position at the inside in a longitudinal direction (i.e., a horizontal direction in the drawing) in the sintered layer 11 of a lower part $L_P$ and it is positioned at a longer length position at the outside in the longitudinal direction in the sintered layer 11 of an upper part $U_P$. If the sintered layer 11 is configured so that a longitudinal length of the sintered layer 11 gradually increases from the lower part $L_P$ to the upper part $U_P$, it is possible to approximately slope the upper surface of a concave portion g downward from the outside toward the inside. Then, in the sintered block B after the optical beam L is irradiated, a projection portion f throwing out to the outside is formed on the side surface of the upper part $U_P$, and the concave portion g receding sloped downward is formed on the side surface of the lower part $L_P$. The excess sintered portion 17 to be generated in the process of laminating the sintered layer 11 is contained in the concave portion g so as not to run out of the side surface of the sintered block B just under the concave portion g. By cutting and processing the excess sintered portion 17 at the side surface of the sintered block B, a sintered block B having a desired external outline shape P can be obtained. In addition, as shown in FIGS. 2A and 2B, the sintered block B is configured in design so that the lower part $L_P$ of the side surface of the sintered block B recedes in a rectangular. Then, the projection portion f throwing out to the outside is formed on the side surface of the upper part $U_P$ of the sintered block B, and the concave portion g receding inward in a rectangular is formed on the side surface of the lower part $L_P$ of the sintered block B.

Figure 4A:
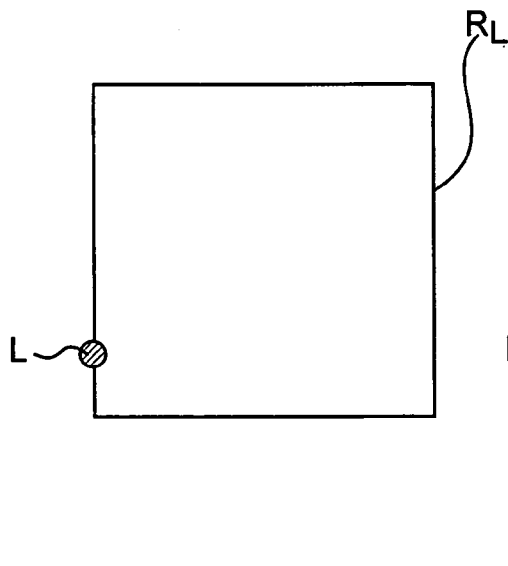
FIG. 4A is an explanatory view explaining scanning of an optical beam at a lower part of a sintered block.
Figure 4B:
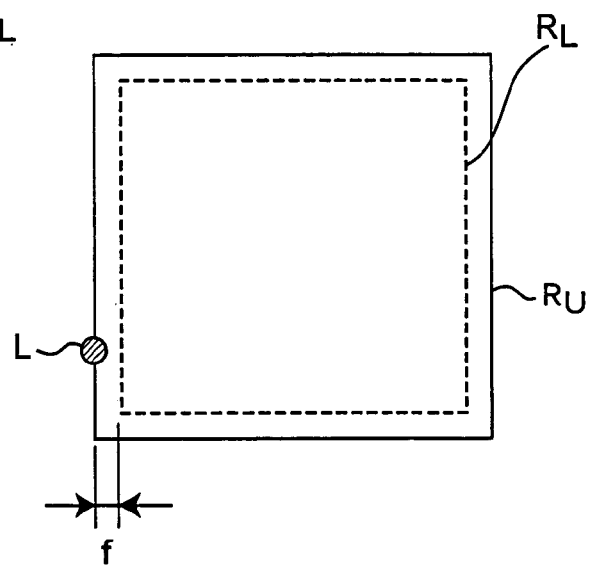
FIG. 4B is an explanatory view explaining scanning of an optical beam at an upper part of a sintered block.
Figure 4C:
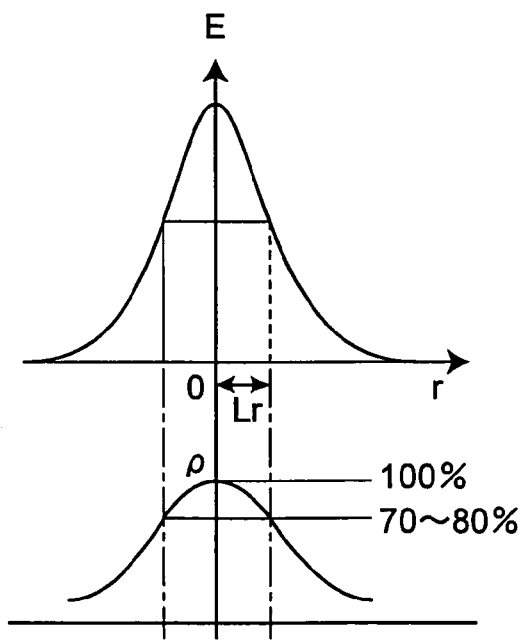
FIG. 4C is an explanatory view explaining a relation between an energy density and a spot diameter of the optical beam.

Further, upon making the sintered block B having such a shape, as shown in FIG. 4C, a spot of a diameter 2Lr capable of obtaining a sintering density ρ not less than 70 to 80% is used from among the spots of the optical beam L. On the side of the lower part $L_P$ of the sintered block B, as shown in FIG. 4A, the optical beam L is scanned along a scanning outline shape $R_1$ that is calculated on the basis of the three-dimensional CAD data. On the side of the upper part $U_P$ of the sintered block B, as shown in FIG. 4B, the optical beam L is scanned along a scanning outline shape $R_U$ protruding from the scanning outline shape $R_1$, which is calculated on the basis of the three-dimensional CAD data, by f. In this way, a protruding portion f can be formed.

The portion f protruding to the outside on the upper part $U_P$ of the sintered block B is cut and removed together with the excess sintered portion 17 when the sintering of the next upper sintered block B to be formed on this sintered block B has been completed.

In addition, according to the above-described embodiment, the protruding portion f on the upper part $U_P$ of the upper sintered block B is needed to be cut and removed, however, compared to the conventional art such that the excess sintered portion 17 may hang from the upper sintered block B to the lower sintered block B, a labor hour and a time required by cutting and removing may be very short.

Figure 5A:
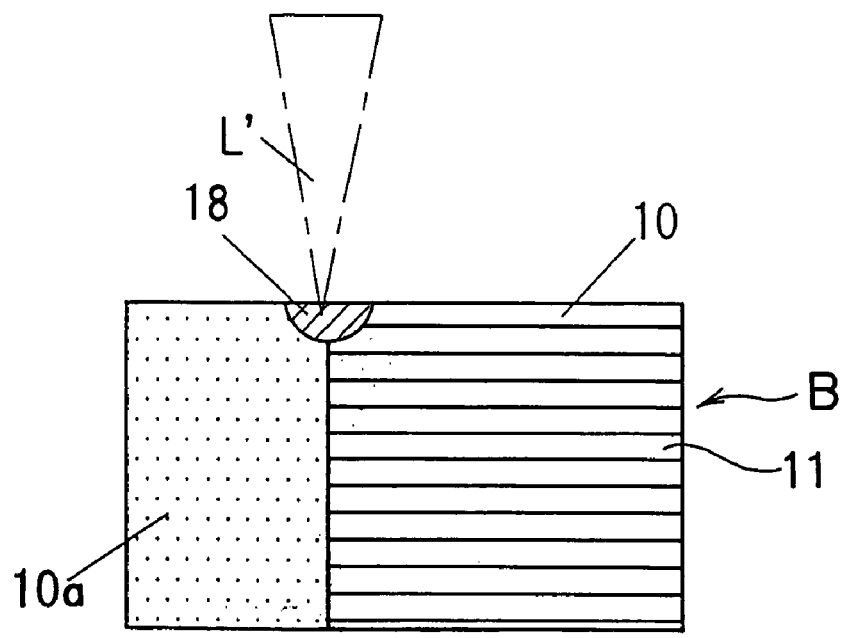
FIG. 5A is a pattern cross sectional view explaining a manner of sintering (provisional sintering) of an outline portion showing the other embodiment according to the present invention.
Figure 5B:
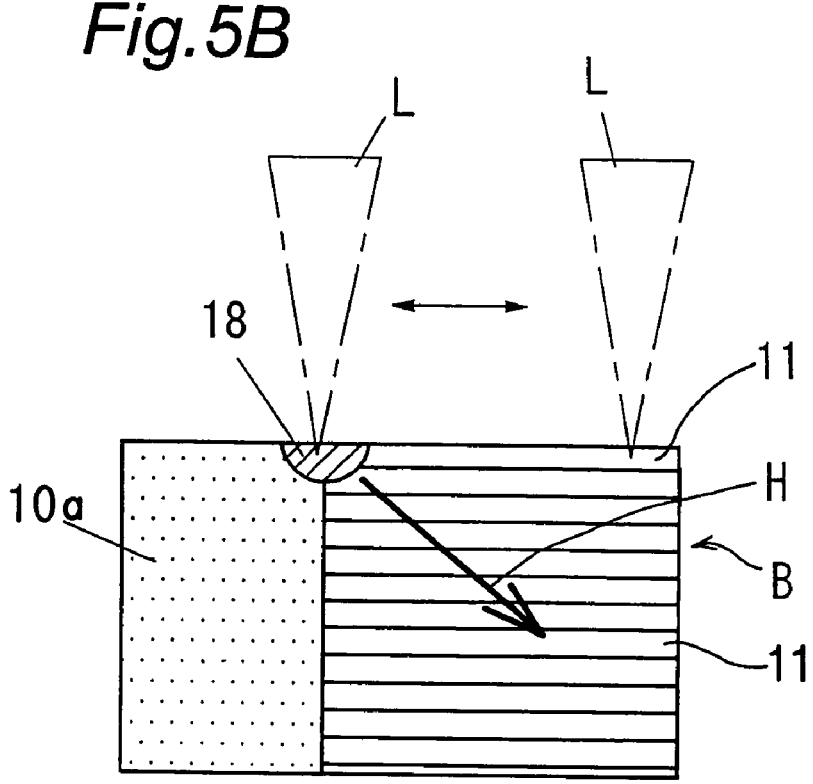
FIG. 5B is a pattern cross sectional view explaining a manner of actual sintering after sintering (provisional sintering) of the outline portion shown in FIG. 5A.

FIG. 5 shows the other embodiment. In FIG. 5, after cutting and removing the lower sintered block B, upon sintering a required portion of the powder material layer 10 corresponding to the next upper sintered block B, an optical beam L' is scanned on a portion to be sintered first, namely, along a scanning outline such as an outer margin and an inner margin. As a result, an outline sintered portion 18 is formed as a provisional sintered portion along a narrow scanning outline. In the next place, by irradiating the optical beam L on a portion to be sintered surrounded by the outline sintered portion 18 and sintering this portion, the sintered layer 11 is formed as an actual sintered portion. In this case, a degree of sintering of the optical beam L' for forming the outline sintered portion 18 is made small by making an energy thereof smaller than that of the optical beam L for a normal actual sintering and scanning it at a high speed.

The outline sintered portion 18 formed along the scanning outline form (i.e., the very small excess sintered portion 17) will act so as to release the heat from the optical beam L to the lower sintered bock B that has been already formed when accepting the irradiation of the optical beam L. This prevents the excess sintered portion 17 from largely growing and hanging on the outer surface of the lower sintered block B. After cutting and processing the lower sintered block B, upon forming the first sintered layer 11 of the next upper sintered block B, the outline sintered portion 18 is formed. However, the outline sintered portion 18 is formed not only upon forming the first sintered layer 1, but also upon forming the other sintered layer 11. In other words, the formation of the outline sintered portion 18 is carried out at least once, and the formation of the sintered layer 11 is carried out at plural times.

Figure 6:
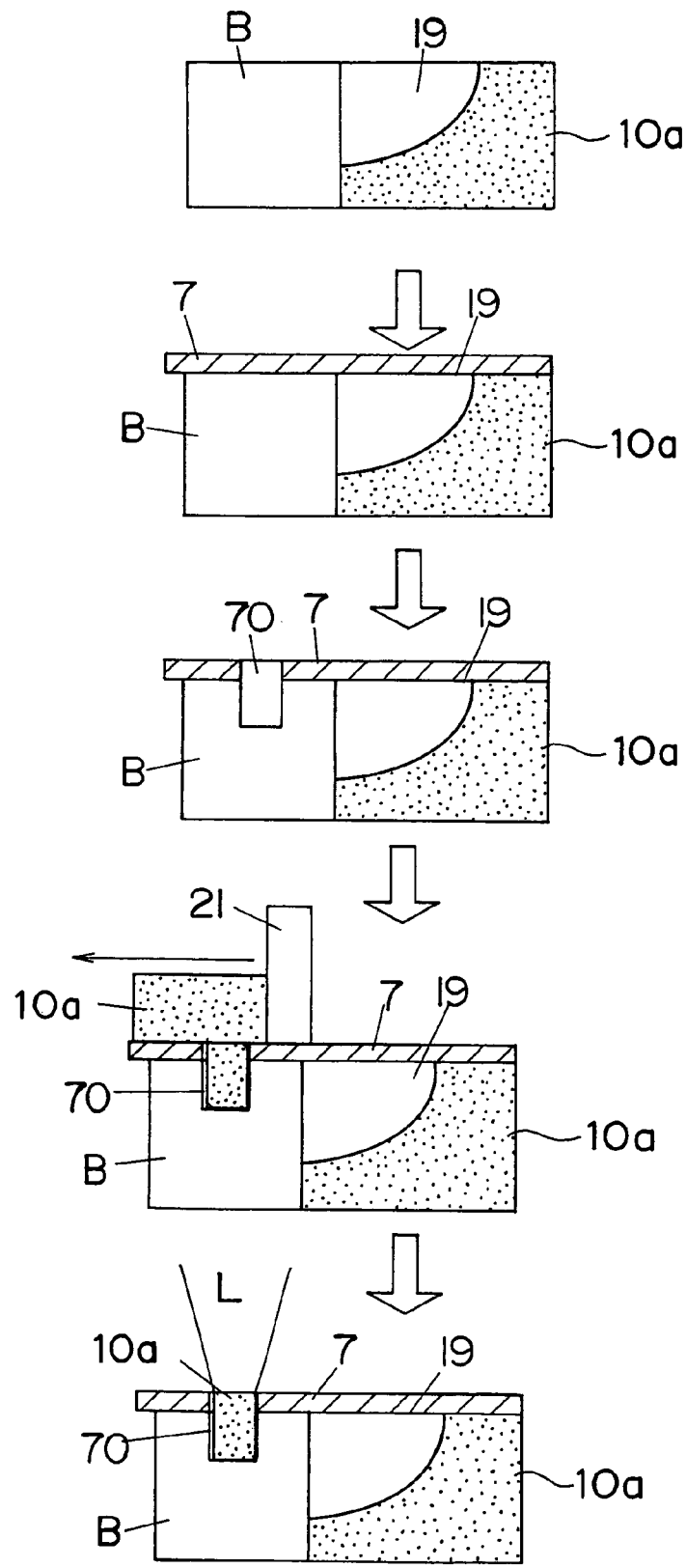
FIG. 6 is a step explanatory view of the other embodiment according to the present invention.
Figure 7:
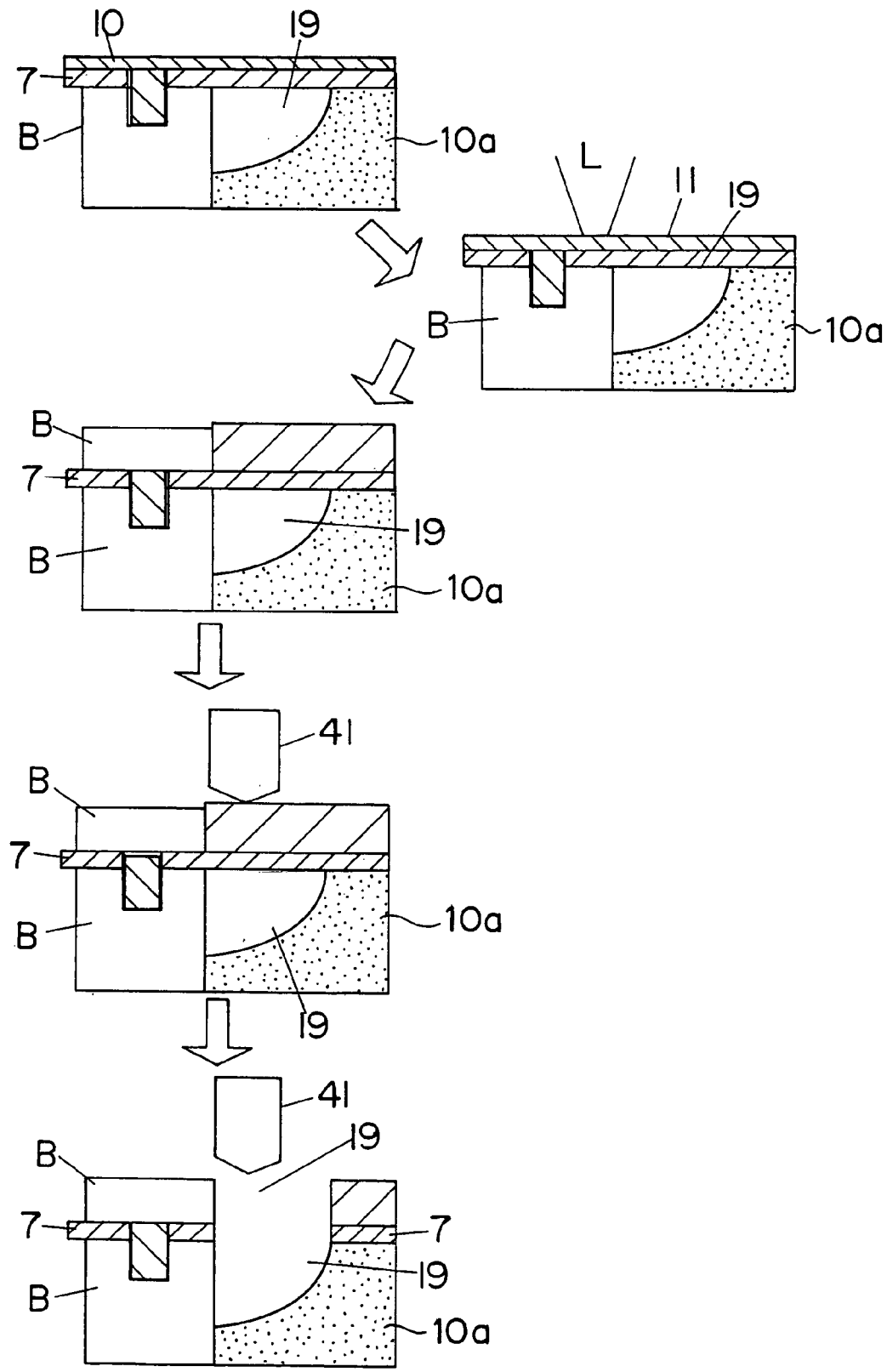
FIG. 7 is a step explanatory view following the step explanatory view of FIG. 6.

FIGS. 6 and 7 show the other embodiment. According to this embodiment, after the cutting and processing of the low sintered block B is performed by the cutting and processing means 4, a thin plate 7 constituted by a thin iron plate is placed on the lower sintered block B to cover the lower sintered block B and an outer peripheral groove 19 generated as a processing trace of the cutting and processing means 4. Then, a hole 70 is formed through the thin plate 7 and the lower sintered block B by using the cutting and removing means 4 and the powder material 10a is filled in the hole 70. By irradiating the optical beam L on the powder material 10a filled in the hole 70, the thin plate 7 and the lower sintered block B is integrally sintered and adhered.

Thereafter, the making step moves to the next upper sintered block B. Specifically, after forming the powder material layer 10, the sintered layer 11 is formed. The formation of the powder material layer 10 and the sintered layer 11 is repeated to form the upper sintered block B. In this case, since a groove 19 of the lower sintered block B is covered with the thin plate 7, the excess sintered portion 17 from the upper sintered block B neither hangers nor enters the groove 19. Then, in the step of cutting and removing of the upper sintered block B, by using the cutting and removing means 4, an unnecessary portion of the above-mentioned thin plate 7 is cut and removed.

Figure 8:
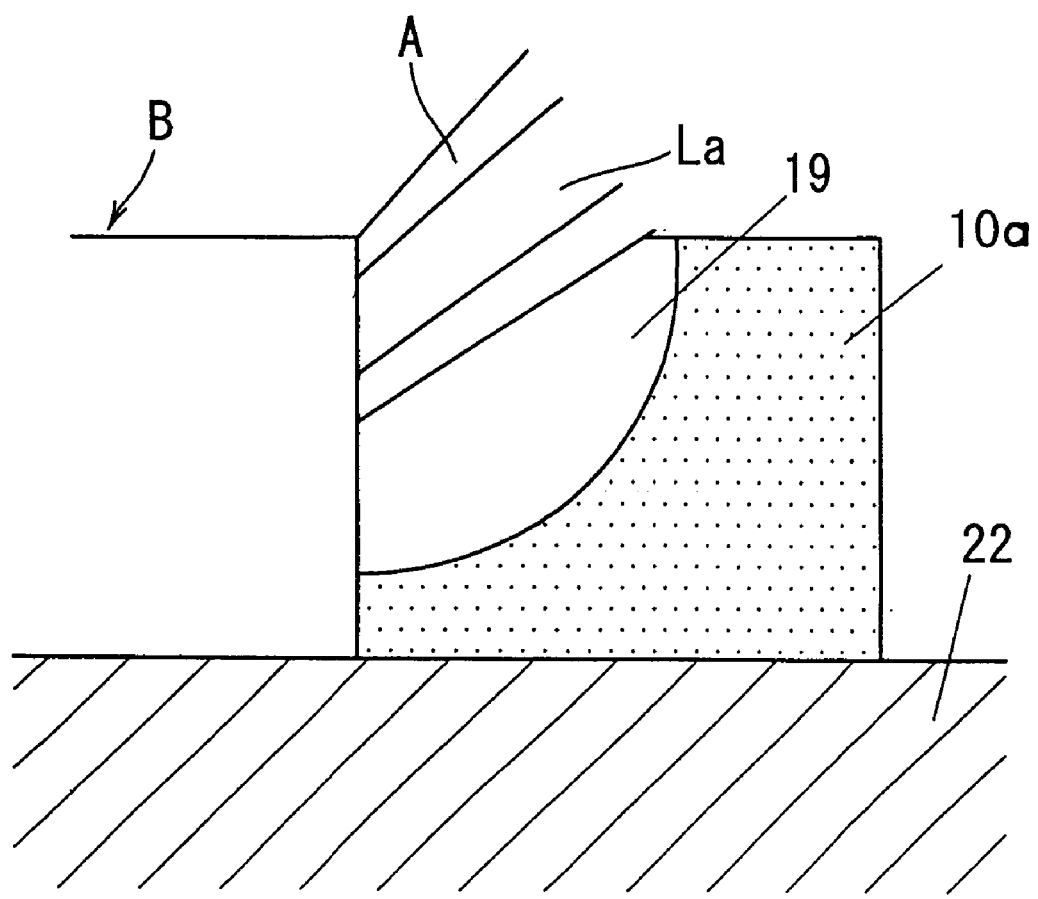
FIG. 8 is a pattern cross sectional view explaining the further other embodiment according to the present invention.

Furthermore, as shown in FIG. 8, it is possible to process the surface of the outer circumferential groove 19, which is generated as a processing trace of cutting processing with respect to the sintered block B by using the cutting and removing means 4, so as to prevent the powder material 10a from being attached to the groove 19. According to this surface processing, for example, irradiating the optical beam La while spraying air or oxidant A, an oxidized film is formed on the side surface of the upper part of the sintered block B. Since the powder material 10a is difficult to attach to the surface of the groove 19 due to such surface processing, the generation of the excess sintered portion 17 is restricted. In addition, even if the excess sintered portion 17 is formed on the sintered block B, the adherence of the excess sintered portion 17 with respect to the sintered block B is weak, so that the excess sintered portion 17 is easily detached from the sintered block B. In other words, during cutting and processing of the sintered block B, the excess sintered portion 17 is easily detached and removed from the sintered block B.

Figure 9:
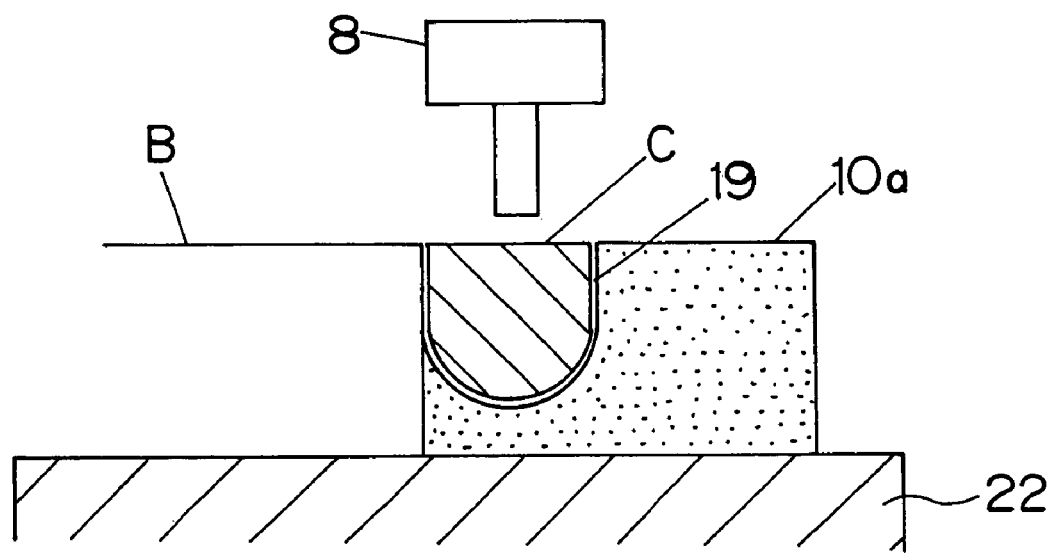
FIG. 9 is a pattern cross sectional view explaining the further other embodiment according to the present invention.

In addition, as shown in FIG. 9, a material C that is hardly attached to the sintered block B (namely, the sintered layer 11), for example, ceramic powders, of which particle diameter φ is in the rage from 10 μm to 50 μm, are filled in the groove 19 generated as a processing trace of cutting and processing by the cutting and processing means 4, and then, the sintered layer 11 of the next upper sintered block B may be formed. Even if the excess sintered portion 17 is formed from the upper sintered block B to hang to the lower sintered block B, since the periphery of the lower sintered block B is surrounded with the nonadhesive material C, the excess sintered portion 17 is not fixed on the side surface of the lower sintered block B.

Figure 10A:
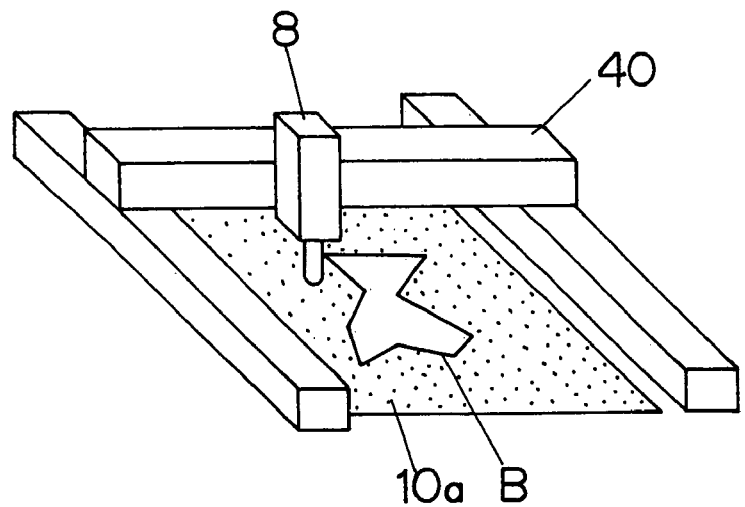
FIG. 10A is a perspective view explaining the embodiment shown in FIG. 9.
Figure 10B:
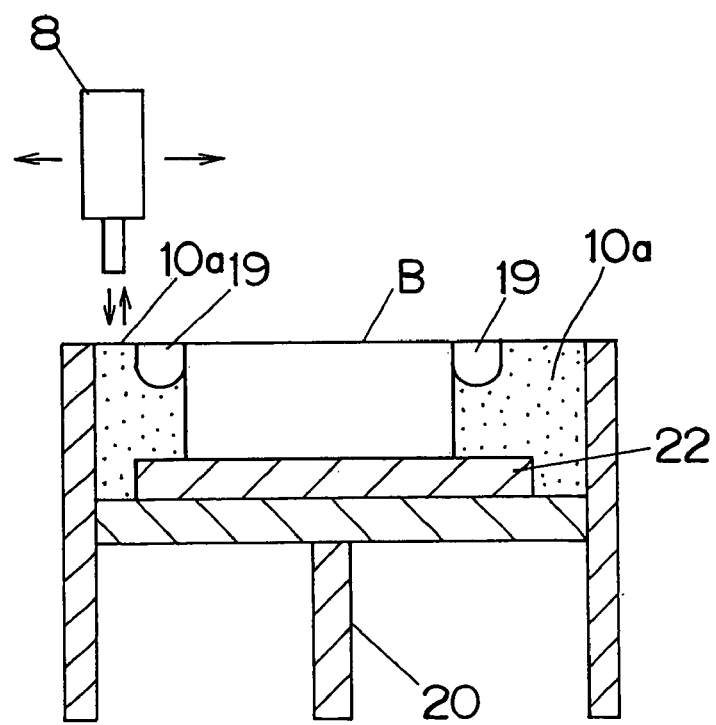
FIG. 10B is a cross sectional view explaining the embodiment shown in FIG. 9.

As shown in FIG. 10A and FIG. 10B, the nonadhesive material C is supplied by a dispenser 8. In other words, the dispenser 8 that is attached to the XY driving mechanism (the XY driving mechanism 40 in the cutting and removing means 4 can be used) is positioned in the groove 19, which is formed around the sintered block B. After that, an appropriate amount of the nonadhesive material C is correctly filled from the dispenser 8 into the groove 19.

Figure 11A:
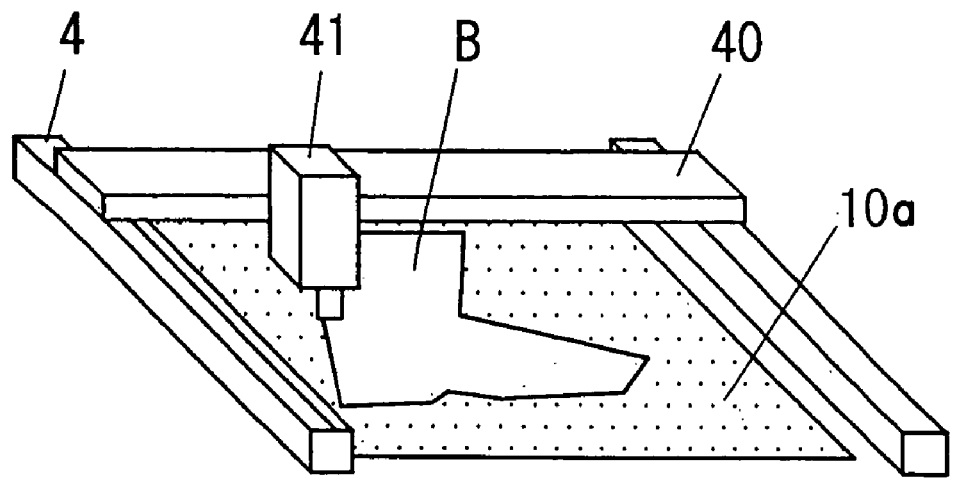
FIG. 11A is a perspective view showing the further other embodiment according to the present invention and shows a manner of forming of a sintered layer.
Figure 11B:
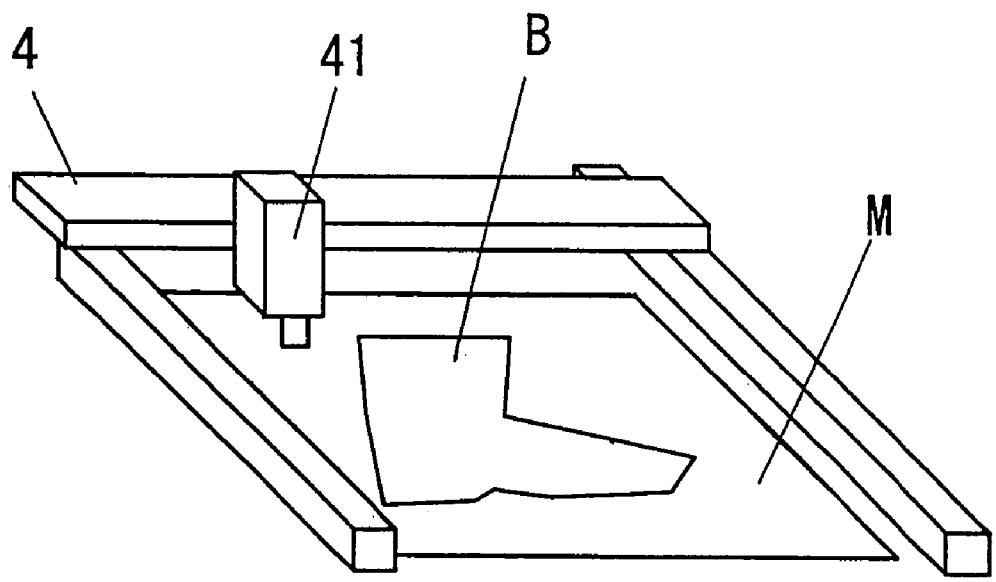
FIG. 11B is a perspective view showing the further other embodiment according to the present invention and shows a manner that a mask plate is arranged on the sintered layer.

In addition, as shown in FIG. 11A, the lower sintered block B is cut and removed by the cutting and removing means 4, and then, as shown in FIG. 11B, the sintered block B is covered with a mask plate M, which is provided with an aperture having approximately the same shape as the plane outline shape of the lower sintered block B. In this state, the powder material layer 10 corresponding to the upper sintered block B is formed and at the same time, the sintered layer 11 is formed. By providing the mask plate M, the excess sintered portion 17 is prevented from moving to the lower sintered block B across the mask plate M.

Further, as the powder material 10*a*, an organic one or an inorganic one is used. As the inorganic powder material, for example, the powder disclosed in JP-A-2001-152204, namely, a powder material including a ferrous powder and a nonferrous powder not less than one kind that is selected from among a group made of Nickel, a nickel alloy, Copper and a copper alloy may be preferably used. In addition, an iron, copper, titanium, aluminum, magnesium super hard alloy may be also used. As an organic powder material, a thermal plastic resin, of which principle component is Nylon and ABS or the like, may be preferably used.

The present disclosure relates to subject matter contained in priority Japanese Patent Application Nos. 2002-287766, filed on Sep. 30, 2002, and 2003-281262, filed on Jul. 28, 2003, the contents of both of which is herein expressly incorporated by reference in their entireties.

What is claimed is:

1. A method of making a three-dimensional object, comprising:
    (a) forming a powder material layer of inorganic material;
    (b) irradiating an optical beam on a predetermined portion of the powder material layer to form a first sintered layer and integrate the first sintered layer with a second sintered layer just below the first sintered layer;
    (c) repeating (a) and (b) to form a sintered block united with a plurality of the first and second sintered layers, the sides of the sintered block including a concave portion formed on a lower part of the sintered block;
    (d) accenting a hanging portion of an excess portion by the concave portion surface of the lower part of the sintered block;
    (e) removing the excess portion from a surface of the sintered block; and
    (f) repeating (c) to (e) with respect to the sintered block from which the excess portion is removed, in order to make a target shape of a three-dimensional object united with a plurality of the sintered blocks.

2. The method according to claim 1, further comprising uniting with a thin sheet covering the top surface of the sintered block.

3. The method according to claim 1, further comprising treating the surface of the sintered block after removing an excess portion to be unreactive with the powder material.

4. The method according to claim 3, further comprising, after treating the surface of the sintered block, placing non-adhesive powder around the surface of the sintered block.

5. The method according to claim 3, further comprising, after treating the surface of the sintered block, placing a mask on the top surface of the sintered block, the mask having an aperture that is approximately equal to the outline of the sintered block.

6. A method of making a three-dimensional object, comprising:
    (a) forming a powder material layer of inorganic material;
    (b) irradiating an optical beam along an outline of predetermined portion to be sintered of the powder material layer to form an outline-sintered portion;
    (c) irradiating the optical beam on all of predetermined portions to be sintered of the powder material layer to form a first sintered layer and integrate the first sintered layer with a second sintered layer just below the first sintered layer, in which each of the predetermined portions is the predetermined portion;
    (d) repeating (a) and (c) to form a sintered block united with a plurality of the first and second sintered layers;
    (e) removing an excess portion from a surface of the sintered block; and
    (f) repeating (a), (b), (c), (d) and (e) with respect to the sintered block where the excess portion is removed to make a target shape of a three-dimensional object united with a plurality of the sintered blocks.

7. A method of making a three-dimensional object, comprising:
    (a) forming a powder material layer of inorganic material;
    (b) irradiating an optical beam on a predetermined portion of the powder material layer to form a first sintered layer and integrate the first sintered layer with a second sintered layer just below the first sintered layer;
    (c) repeating (a) and (b) to form a sintered block united with a plurality of the first and second sintered layers, the sides of the sintered block including a concave portion wherein an upper surface of the concave portion is declined from the outside toward the inside;
    (d) accepting a hanging portion of an excess portion by the concave portion surface of the lower part of the sintered block;
    (e) removing the excess portion from a surface of the sintered block; and
    (f) repeating (c) to (e) with respect to the sintered block from which the excess portion is removed, in order to make a target shape of a three-dimensional object united with a plurality of the sintered blocks.

8. The method according to claim 7, further comprising uniting with a thin sheet covering the top surface of the sintered block.

9. The method according to claim 7, further comprising treating the surface of the sintered block after removing an excess portion to be unreactive with the powder material.

10. The method according to claim 9, further comprising, after treating the surface, placing non-adhesive powder around the surface of the sintered block.

11. The method according to claim 9, further comprising, after treating the surface, placing a mask on the top surface of the sintered block, the mask having an aperture that is approximately equal to the outline of the sintered block.

* * * * *

UNITED STATES PATENT AND TRADEMARK OFFICE
CERTIFICATE OF CORRECTION

PATENT NO.          : 7,323,132 B2                                           Page 1 of 1
APPLICATION NO.  : 10/671688
DATED                   : January 29, 2008
INVENTOR(S)         : Abe et al.

It is certified that error appears in the above-identified patent and that said Letters Patent is hereby corrected as shown below:

At column 9, line 51, of the printed patent, "accenting" should read -- accepting --

Signed and Sealed this

Twelfth Day of August, 2008

JON W. DUDAS
*Director of the United States Patent and Trademark Office*